(12) United States Patent
Tils (10) Patent No.: US 10,314,119 B2
(45) Date of Patent: Jun. 4, 2019

(54) METHOD FOR DETECTING AN INFLUENCE OF MICROWAVES ON A MEASUREMENT VALUE OF A TEMPERATURE SENSOR, COOKING APPLIANCE AND CORE TEMPERATURE PROBE

(71) Applicant: Topinox Sarl, Wittenheim (FR)

(72) Inventor: Thomas Tils, Landsberg am Lech (DE)

(73) Assignee: TOPINOX SARL (FR)

( * ) Notice: Subject to any disclaimer, the term of this patent is extended or adjusted under 35 U.S.C. 154(b) by 0 days.

(21) Appl. No.: 15/983,234

(22) Filed: May 18, 2018

(65) Prior Publication Data

US 2018/0270917 A1  Sep. 20, 2018

Related U.S. Application Data

(62) Division of application No. 14/561,393, filed on Dec. 5, 2014, now Pat. No. 9,999,103.

(30) Foreign Application Priority Data

Dec. 6, 2013 (DE) .................. 10 2013 113 637

(51) Int. Cl.
*H05B 6/64* (2006.01)
*G01K 1/08* (2006.01)
(Continued)

(52) U.S. Cl.
CPC ............ *H05B 6/6452* (2013.01); *G01K 1/08* (2013.01); *G01K 15/007* (2013.01); *B01J 19/126* (2013.01); *G01K 2207/06* (2013.01)

(58) Field of Classification Search
CPC .......... G01J 5/0265; G01J 5/0003; G01J 5/06; H05B 6/6452; G01K 15/007; G01K 2207/06
See application file for complete search history.

(56) References Cited

U.S. PATENT DOCUMENTS 3,854,024 A * 12/1974 Kaufman, Jr. ......... G05D 23/19
219/492
3,855,440 A * 12/1974 Staats .................. H05B 6/6402
219/750

(Continued)

FOREIGN PATENT DOCUMENTS

DE       2657499        6/1977
DE    10061821 A1       7/2002

(Continued)

*Primary Examiner* — Gail Kaplan Verbitsky
(74) *Attorney, Agent, or Firm* — Hayes Soloway PC (57) ABSTRACT

A method for detecting an influence of microwaves on a measurement value of a temperature sensor of a core temperature probe of a cooking appliance, includes: recording the measurement value of the temperature sensor; determining the slope of the course of the recorded measurement values in at least one analysis interval (A, B) which is in a predetermined relation to a switch-on time and/or a switch-off time of a microwave generator; determining whether the slope lies above or below a predefined threshold; interpreting the exceedance of or falling below the threshold to the effect that the corresponding temperature sensor is not located in a food to be cooked and/or the core temperature probe is not correctly inserted into the food or into a receptacle provided for the same.

14 Claims, 3 Drawing Sheets

(51) Int. Cl.
  *G01K 15/00* (2006.01)
  *B01J 19/12* (2006.01)

(56) References Cited

U.S. PATENT DOCUMENTS

| | | | |
|---|---|---|---|
| 3,974,696 A * | 8/1976 | Fitzmayer | A47J 37/00 374/155 |
| 3,975,720 A * | 8/1976 | Chen | F24C 7/02 219/712 |
| 4,204,186 A * | 5/1980 | Parisi | G01K 7/22 29/612 |
| 4,399,824 A | 8/1983 | Davidson | |
| 4,967,049 A * | 10/1990 | Kaneshiro | G01K 1/00 219/712 |
| 4,969,459 A | 11/1990 | Gusakov | |
| 5,235,148 A | 8/1993 | Yamaguchi et al. | |
| 5,977,531 A * | 11/1999 | Pfister | B65D 81/3453 219/725 |
| 6,979,804 B1 | 12/2005 | Boyer | |
| 7,102,107 B1 | 9/2006 | Chapman | |
| 7,150,891 B2 | 12/2006 | Greiner et al. | |
| 9,968,399 B2 * | 5/2018 | Turner | A61B 18/1815 |
| 2003/0214999 A1 * | 11/2003 | Chapman | G01K 1/024 374/170 |
| 2004/0115325 A1 | 6/2004 | Greiner et al. | |
| 2006/0224349 A1 | 10/2006 | Butterfield | |
| 2007/0095822 A1 * | 5/2007 | Wiseman | H05B 6/6405 219/685 |
| 2014/0086274 A1 * | 3/2014 | Henke | F24C 7/08 374/142 |
| 2016/0262833 A1 | 9/2016 | Rudie | |
| 2017/0167733 A1 * | 6/2017 | Bockler | F24C 7/08 |

FOREIGN PATENT DOCUMENTS

| | | |
|---|---|---|
| DE | 10211643 A1 | 10/2003 |
| DE | 102011050123 A1 | 11/2012 |
| EP | 0294872 A1 | 5/1988 |
| EP | 2136604 A1 | 12/2009 |
| JP | 60171316 A | 9/1985 |
| JP | 02267421 A | 11/1990 |
| JP | H02267421 A | 11/1990 |
| JP | 4010946 B2 | 11/2007 |

* cited by examiner

METHOD FOR DETECTING AN INFLUENCE OF MICROWAVES ON A MEASUREMENT VALUE OF A TEMPERATURE SENSOR, COOKING APPLIANCE AND CORE TEMPERATURE PROBE

CROSS REFERENCE TO RELATED APPLICATIONS

This application is a divisional of U.S. patent application Ser. No. 14/561,393 entitled, "Method for Detecting an Influence of Microwaves on a Measurement Value of a Temperature Sensor, Cooking Appliance and Core Temperature Probe" filed Dec. 5, 2014, which itself claims benefit of German Application Serial No. 102013113637.0 filed Dec. 6, 2013.

FIELD OF THE INVENTION

This invention relates to a method for detecting an influence of microwaves on a measurement value of a temperature sensor of a core temperature probe of a cooking appliance, to a cooking appliance and to a core temperature probe.

BACKGROUND OF THE INVENTION

For the best possible preparation of foodstuffs in a cooking appliance it frequently is necessary to check the temperature in the interior of an item of food. For this purpose, core temperature probes generally are used, which are inserted into the food to be cooked. In such core temperature probe temperature sensors are arranged, which determine the temperature in the interior of the food and transmit the recorded measurement values via a connection to an evaluation unit of the cooking appliance.

Modern professional cooking appliances, as they are used for example in restaurants, canteens or the large-scale catering trade, also can include a microwave generator, in order to support or check the cooking process.

However, the simultaneous use of a core temperature probe and a microwave generator is problematic. Via the part of the core temperature probe protruding from the food to be cooked and via the supply line, the electric field of the microwave field is picked up like by an antenna and passed to the temperature sensors. The core temperature probe thereby heats up strongly, so that overheating of the food to be cooked and damages at the temperature sensors can occur. In addition, by strong heating of the core temperature probe a wrong measurement value can be transmitted to the evaluation unit, which can negatively influence the control of the cooking process.

It is the object of the invention to provide a method or an apparatus, in order to prevent damages at the core temperature probe and avoid an impairment of the cooking process due to faulty measurements.

BRIEF DESCRIPTION OF THE INVENTION

The object is solved by a method for detecting an influence of microwaves on a measurement value of a temperature sensor of a core temperature probe of a cooking appliance, comprising the following steps:
  recording the measurement value of the temperature sensor,
  determining the slope of the course of the recorded measurement value in at least one analysis interval which is in a predetermined relation to a switch-on time and/or a switch-off time of a microwave generator,
  determining whether the slope lies above or below a predefined threshold, and
  interpreting the exceedance of or falling below the threshold to the effect that the corresponding temperature sensor is not located in a food to be cooked and/or the core temperature probe is not correctly inserted into the food or into a receptacle provided for the same.

"In a predetermined relation to the switch-on time and/or a switch-off time" means that the analysis interval, i.e. the measurement values used for determining the slope, is chosen such that they have a predetermined temporal distance to the function of the microwave generator. For example, the analysis interval always can start a few seconds after switching on the microwave generator and end when the microwave generator is switched off. The analysis interval also can start when the microwave generator is switched off and can have a predetermined duration.

Due to the comparison of the slope with a setpoint it is possible to detect irregularities in the temperature profile, which are based on direct interactions with microwaves and thus indicate an incorrectly placed temperature sensor. When a wrongly placed temperature sensor has been detected, corresponding countermeasures can be initiated, in order to prevent damages at the temperature sensor or an impairment of the cooking process.

Preferably, the microwave generator is switched on at least during a part of the analysis interval, so that the effect of the microwave radiation on the temperature profile of the core temperature probe can be recorded directly.

For example, the cooking process is stopped or terminated and/or a warning signal, in particular a warning tone or a warning message is issued, when the exceedance of or falling below the threshold is interpreted to the effect that the corresponding temperature sensor is not located in the food to be cooked or the core temperature probe is not located correctly in the receptacle provided for the same. These measures prevent a damage of the core temperature probe or an impairment of the cooking process either directly or they prompt the user of the cooking appliance to take corresponding measures.

In one embodiment of the invention, a time-left prediction is used to determine whether the slope lies above or below a predefined threshold, whereby analyzing the slope is simplified considerably, as parameters determined already are used.

In one design variant the exceedance of the threshold is interpreted to the effect that the corresponding temperature sensor is not located in the food to be cooked or the core temperature probe is not correctly located in the receptacle provided for the same, when the slope has been determined from measurement values which have been recorded while the microwave generator was switched on. In this way, it can be detected that the temperature sensor is heated directly by the microwave field and as a result measurement values are recorded, which do not correspond to the actual temperature of the food to be cooked. Thus, falsifications of the cooking process can be detected promptly.

In a further aspect of the invention falling below the threshold is interpreted to the effect that the corresponding temperature sensor is not located in the food to be cooked or the core temperature probe is not correctly located in the receptacle provided for the same, when the slope has been determined from measurement values which have been recorded after the microwave generator was switched off. This provides for securely detecting whether the temperature sensor has been heated directly by the microwave field. In this case, the temperature of the temperature sensor lies above that of the cooking space atmosphere, so that the same cools the temperature sensor after switching off the microwave generator. However, big temperature drops in cooking processes are unusual, so that it can be assumed in this case that the recorded measurement values do not correspond to the actual temperature of the food.

For example, the predefined threshold can be adapted to the power with which the microwave generator emits microwaves, whereby influences of microwaves also can be detected at low powers of the microwave generator.

In a further embodiment, the microwave generator is briefly switched on before the beginning of a cooking process and the measurement values of the temperature sensor are recorded and evaluated, whereby it becomes possible to detect an incorrectly placed core temperature probe already before the beginning of the cooking process.

The object furthermore is solved by a cooking appliance with a cooking space, a microwave generator and a receptacle for a core temperature probe, which is arranged in the cooking space, wherein the receptacle includes an insertion opening for the core temperature probe and in the region of the insertion opening a HF short-circuit is provided. In this way, a safe storage position is created for the core temperature probe, in which the core temperature probe is sufficiently protected from microwave radiation.

Preferably, the receptacle includes a hollow cylindrical body with two ends, wherein the insertion opening is provided at one end of the hollow cylindrical body and the other end is closed. In this way, a protection of the core temperature probe is ensured.

Preferably, the body represents a waveguide of the length $\lambda/2$ or a multiple thereof, so that a HF short-circuit is obtained at the insertion opening for the core temperature probe. $\lambda$ designates the wavelength of the microwaves emitted by the microwave generator.

The object also is solved by a core temperature probe for a cooking appliance, comprising at least one temperature sensor and a connection, in particular a cable, to an evaluation unit, wherein a microwave trap, in particular a $\lambda/4$ trap, is arranged between the temperature sensor and the connection. In this way, it is prevented that through the part of the core temperature probe protruding from the food or through the cable microwaves get to those regions of the core temperature probe which are located inside the food.

The connection can, however, also be of the wireless type. In this case, there is a risk that microwave radiation couples into the antenna of the core temperature probe.

Preferably, the core temperature probe includes a handle region and an insertion region, wherein the temperature sensor is arranged in the insertion region and at least one electric line extends through the handle region to the connection and the microwave trap is arranged in the handle region such that it can prevent electromagnetic waves in the microwave range, which propagate in and/or along the line, from reaching the insertion region. In use of the core temperature probe, the insertion region is introduced into the food at least almost completely, so that an arrangement of the microwave trap in the handle region ensures the intended protection for the temperature sensors.

According to a preferred embodiment, two microwave traps are arranged in the handle region, which have a resonance frequency slightly shifted or offset against each other. In this way, a more broadband effect, a lower susceptibility to errors and a better suitability for cooking appliances operating with microwave radiation of different frequencies is obtained.

For example, at least in the region of the handle region the line extends in an electrically conductive sheath on which the microwave trap is arranged, wherein the line and the sheath are insulated against each other. This provides for a simple design of the microwave trap.

In one aspect of the invention the microwave trap is formed as a lambda/4 trap, so that a proven method for the reflection of microwave rays is used.

Preferably, the microwave trap includes an electrically conductive, in particular circular cylindrical trap portion which surrounds the sheath, wherein on its side facing away from the connection the trap portion is in contact with the sheath, in particular is closed up to the sheath. In this way, a microwave trap is provided in a simple way.

In the region of the microwave trap, a dielectric, in particular a ceramic, can be provided between the sheath and the trap portion, so that the geometric length of the trap portion can be reduced with the electric length remaining the same.

Preferably, the trap portion has a geometric length which corresponds to the electric length of approximately one quarter of the wavelength of the electromagnetic radiation used in the cooking appliance, so that the microwave trap is adjusted to the radiation used in the cooking appliance. The electric length is influenced by a possibly existing dielectric between the trap portion and the sheath.

In one aspect of the invention the sheath is designed as tube, so that the sheath provides a stable channel for the line.

The sheath can, however, also be designed as wire mesh.

For example, the sheath extends up into the insertion region, and the temperature sensor is arranged in the sheath, whereby the manufacture of the core temperature probe is simplified considerably.

In one design variant the handle region includes a handle which surrounds the microwave trap, so that the microwave trap is not easily perceived by the user of the core temperature probe.

The handle can be made of a plastic material, for example of PEEK, whereby it becomes particularly heat-resistant.

In a further aspect of the invention, the connection can be designed without shield, whereby the costs for the manufacture of the connection are reduced.

BRIEF DESCRIPTION OF THE DRAWINGS

Further features and advantages of the invention can be taken from the following description and the attached drawings, to which reference is made and in which.

DETAILED DESCRIPTION OF THE INVENTION

Figure 1:
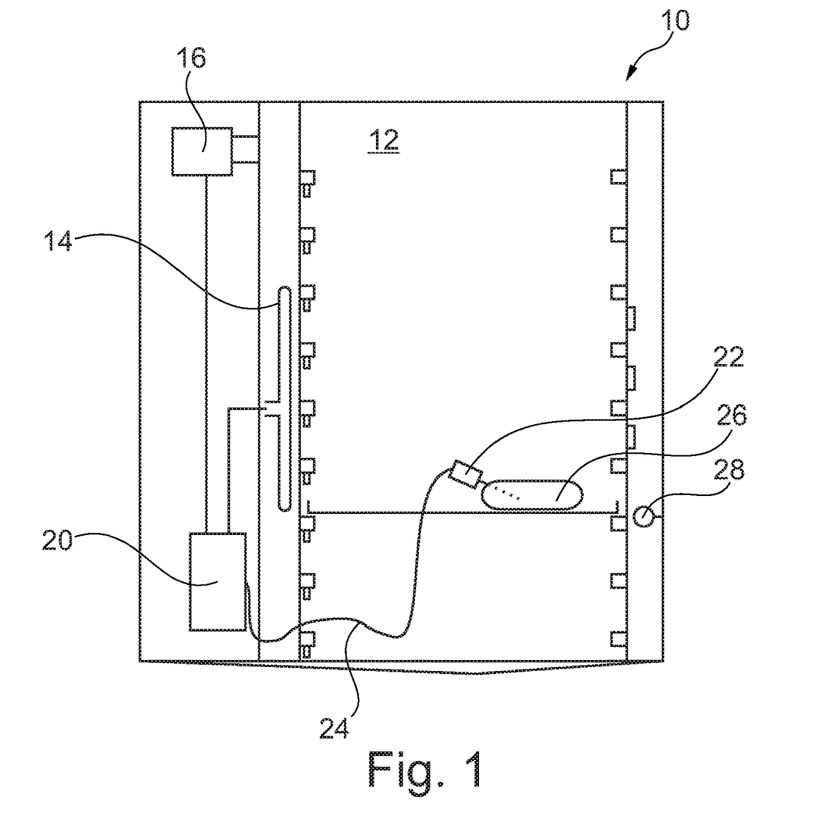
FIG. 1 schematically shows a section through a cooking appliance according to the invention with a core temperature probe according to the invention.

FIG. 1 schematically shows a section through a cooking appliance 10 which includes a cooking space 12. A heating device 14 and a microwave generator 16 also are arranged in the cooking appliance 10, which are connected with a control unit 20 and are controlled by the same.

The microwave generator 16 is formed to generate microwaves with a wavelength λ (or via a frequency band around the wavelength λ) and guide the same into the cooking space 12.

In the cooking space 12 a core temperature probe 22 is provided, which is in connection 24 with the control unit 20, here by means of a cable. In the situation shown, the core temperature probe 22 already is inserted into the food 26 to be cooked. The food 26 is located on a food carrier in one of several slots in the cooking space 12.

In addition, a receptacle 28 for the core temperature probe 22 is provided in the cooking space 12. The receptacle 28 for example can be attached to the cooking space wall or to a shelf rack.

Figure 2:
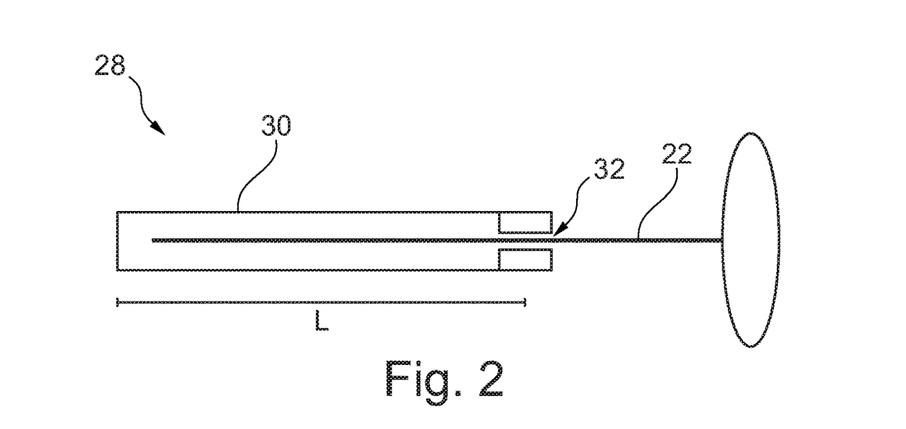
FIG. 2 shows a schematic sectional view of a receptacle for a core temperature probe, FIG. 3 schematically shows a section through a first embodiment of a core temperature probe according to the invention.

In FIG. 2, the receptacle 28 is shown on an enlarged scale. It includes a substantially cylindrical, in particular circular cylindrical body 30 which on one of its end faces has an insertion opening 32. The other end of the body 30 is closed.

The body 30 is made of a conductive material, in particular metal or steel, and can be realized as completely closed cylinder or as wire mesh.

The length L between the insertion opening 32 on the one side and the end of the body 30 on the other side is chosen such that the body 30 represents a waveguide which corresponds to the length of half the wavelength λ of the microwaves generated by the microwave generator 16 or a multiple thereof. In this way, a HF short-circuit is produced at the insertion opening 32, at which microwaves are reflected.

Figure 3:
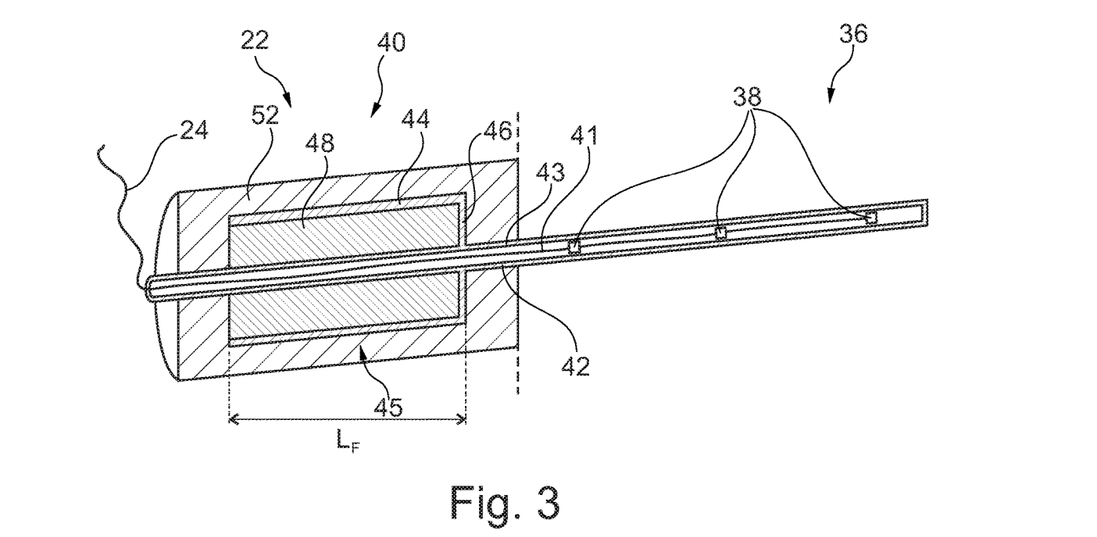

A first embodiment of the core temperature probe 22 is shown in FIG. 3 in a section.

The core temperature probe 22 is used to check the temperature in the interior of a food 26 to be cooked during the cooking operation in a cooking appliance 10.

The core temperature probe 22 includes two regions which in the drawing are separated from each other by the broken line. The region to the right of the broken line is provided as insertion region 36, which is characterized in that during the cooking operation it is completely inserted into the food 26. In the insertion region 36 at least one temperature sensor 38 is provided.

Figure 5:
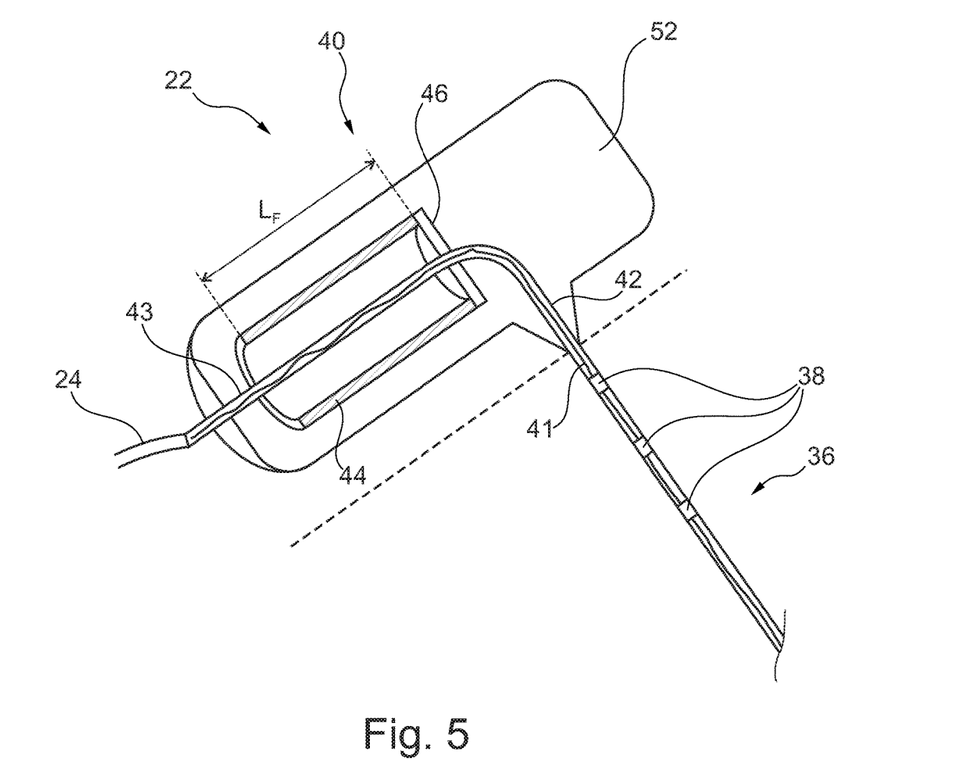

In the embodiments shown three temperature sensors 38 are used. Any other number of temperature sensors 38 is of course also conceivable.

The region of the core temperature probe 22 to the left of the broken line is a handle region 40 which during the operation of the cooking appliance 10 protrudes from the food 26 to be cooked or from the receptacle 28.

On its side facing away from the insertion region 36 the handle region 40 includes the connection 24 which can be connected with a control unit 20 of the cooking appliance 10.

An electric line 41 extends from the connection 24 through the handle region 40 up to the temperature sensors 38.

In the embodiments shown, the connection 24 is a cable which for example can also be designed without a shield against electromagnetic radiation.

It is, however, also conceivable that the connection 24 is a wireless connection and merely an antenna is provided at the handle region 40.

The line 41 is surrounded by a sheath 42, which in the embodiments shown is designed as metal tube. The line 41 is insulated against the sheath 42. The line 41 very well can be of the multi-core type.

The sheath 42 extends from the connection 24 through the handle region 40 into the insertion region 36.

In the insertion region 36, the temperature sensors 38 are arranged in the sheath 42. In this way, the sheath 42 represents a housing for the components necessary for the measurement and can be regarded as rod-shaped base body 43 of the core temperature probe.

At the end of the base body 43 located in the handle region 40, the connection 24 of the core temperature probe 22 with the control unit 20 hence is provided. In the embodiment shown, the connection 24 is realized by a cable. However, a wireless connection also is conceivable.

A part of the sheath 42 along the longitudinal extension of the sheath 42 in the handle region 40 is surrounded by a trap portion 44 which is made of a conductive material, for example metal.

The trap portion 44 completely surrounds the sheath 42 as seen in circumferential direction.

The trap portion 44 is formed as hollow circular cylinder, wherein the axis of the circular cylinder extends parallel to, in particular corresponds with the longitudinal axis of the sheath 42.

The trap portion 44 is open towards the connection 24.

On its side facing away from the connection 24, the trap portion 44 has a conductive end wall 46 which closes the trap portion 44 up to the sheath 42. In this way, the trap portion 44 is in contact with the sheath 42 or the trap portion 44 is formed at the sheath 42.

The end wall 46 can be formed integrally with the trap portion 44, and it is not necessary that the end wall 46 protrudes into the sheath 42 in radial direction with respect to the longitudinal axis of the sheath 42.

In the first embodiment the sheath 42, the trap portion 44 and the end wall 46 are formed in one piece.

Between the trap portion 44 and the sheath 42 a dielectric 48 is provided as seen in radial direction, which in particular can be a ceramic. The dielectric 48 preferably fills up the entire space between sheath 42 and trap portion 44.

The geometric length $L_F$ of the trap portion 44 along its longitudinal axis is dependent on the wavelength of the microwave radiation which is used in the cooking appliance. The length $L_F$ is chosen such that the electric length of the trap portion 44 along its longitudinal axis approximately corresponds to one quarter of the wavelength of the electromagnetic radiation used in the cooking appliance.

The electric length is influenced by the material present in the trap portion 44, i.e. in the first embodiment by the dielectric 48.

The trap portion 44, the dielectric 48 and the sheath 42 in the region of the trap portion 44 together form a microwave trap 45, which is designed as lambda/4 trap.

Around the trap portion 44 and thus around the microwave trap 45 a handle 52 is provided in the handle region 40, which facilitates handling of the core temperature probe 22 for a user of the core temperature probe 22.

The handle 52 is made of a plastic material. PEEK for example is suitable for this purpose.

The handle 52 preferably completely surrounds the microwave trap 45, so that the function of the microwave trap 45 cannot be impaired by impurities.

In the handle region 40, directly adjacent to the insertion region 36, a microwave trap 45 is provided. The same for example is designed as Δ/4 trap and completely surrounds the base body 43 in circumferential direction.

The microwave trap 45 can be designed as part of a handle 52.

It is also conceivable that the sheath 42 protrudes on the side of the handle 52 facing the connection 24.

When the core temperature probe 22 now is used in a cooking appliance with the microwave generator switched on, microwave radiation can be captured by the connection 24. The captured microwave radiation then at least partly propagates into the handle region 40 and on in direction of the insertion region 36.

In conduction theory, the microwave trap 45 can regarded as waveguide for the captured microwave radiation, in which a short circuit is produced by the end wall 46. The short circuit at the end of the microwave trap 45, i.e. on the side of the trap portion 44 facing away from the connection 24, is transformed into idling at the beginning of the microwave trap 45. Idling in turn effects the reflection of electromagnetic waves, so that the captured microwave radiation is reflected on the side of the trap portion 44 facing the connection 24.

The microwave trap 45 thus prevents electromagnetic waves in the microwave range, which propagate proceeding from the connection 24 towards the insertion region 36, from reaching the insertion region 36.

For which wavelength the microwave trap 45 has a reflecting effect depends on the electric length of the trap portion 44. For this reason, an adaptation of the electric length to the wavelength of the microwave radiation used in the cooking appliance is necessary.

For the case that a broadband microwave source is used, it is recommendable to adjust the microwave trap 45 to a wavelength in the middle of the spectrum of the microwave source.

In such a case, several microwave traps 45 are of course also conceivable, which are adjusted to various wavelengths.

For preparing a food 26 in the cooking appliance 10, the core temperature probe 22 initially is inserted into the food 26 such that the insertion region 36 of the core temperature probe 22 is completely located in the food 26. This is the correct position for the core temperature probe 22.

Whether the core temperature probe has correctly been inserted into the food can be checked by checking for example the transmitted temperature values for plausibility. This can be effected via the derivative of the temperature values with respect to time or the comparison of the values of two sensors of the core temperature probe. Only when the controller of the cooking appliance detects that the core temperature probe has correctly been placed in the food, can the microwave generator be put into operation.

When the core temperature probe 22 is not required for the preparation of the food 26, it is introduced into the receptacle 28 as depicted in FIG. 2. FIG. 2, however, shows a core temperature probe 22 without separate microwave trap 45. The core temperature probe 22 is guided through the insertion opening 32 of the body 30, until all temperature sensors 38 are located in the interior of the receptacle 28. This is the correct position for the core temperature probe 22 in the receptacle 28.

When the core temperature probe 22 is in one of the correct positions described above, the microwave generator 16 can be put into operation without hesitation. The microwaves generated by the microwave generator 16 and guided into the cooking space 12 are picked up by the exposed handle region 40 and the possibly existing cable and are guided in direction of the insertion region 36 of the core temperature probe. Due to the microwave trap 45 at the core temperature probe 22 or the HF short-circuit at the insertion opening 32 of the receptacle 28, the microwaves however are reflected, so that they do not get into the insertion region 36 and thus to the temperature sensors 38. In this way, a damage of the temperature sensors 38 or heating of the insertion region 36 is securely prevented, so that the microwave generator 16 can be operated without any risk.

When the core temperature probe 22 is not correctly introduced into the food 26 or the receptacle 28, microwaves propagate into the insertion region 36 and lead to strong heating of the insertion region 36. The generated currents likewise can damage the temperature sensors 38. The strong increase in temperature of the insertion region 36 of course is detected by the temperature sensors 38 and the measurement value is forwarded to the control unit 20 and recorded by the same. This recorded measurement value, however, does not correspond to the actual temperature of the food, so that the interpretation of this measurement value would lead to wrong results that would negatively influence the further control of the cooking process.

Figure 4:
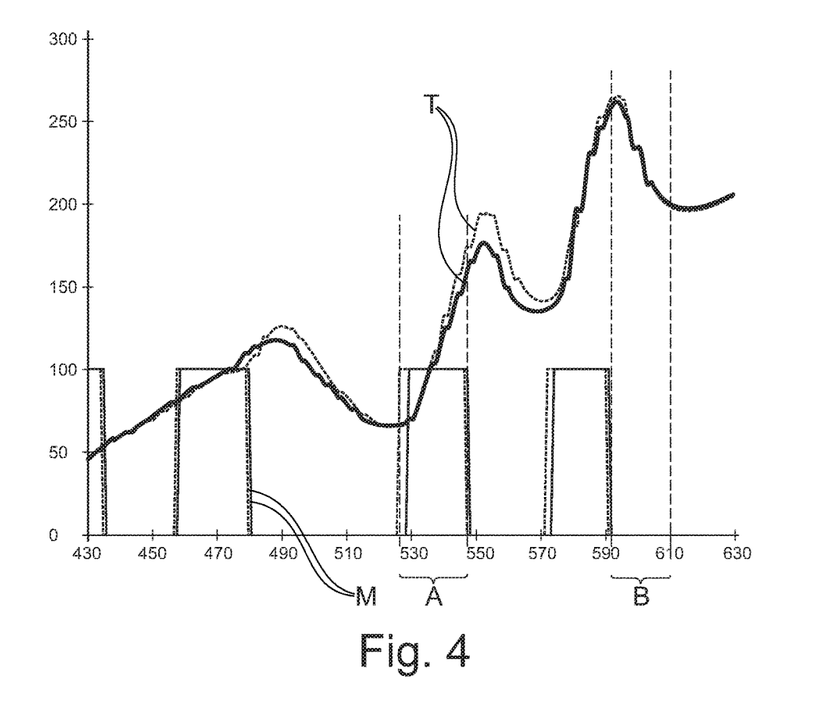
FIG. 4 shows an exemplary recorded temperature profile while carrying out the method according to the invention, and FIG. 5 schematically shows a section through a second embodiment of a core temperature probe according to the invention.

In FIG. 4, the recorded measurement values of second temperature sensors 38 are plotted against the time (curves T). The power output of the microwave generator 16 likewise is represented by the curves M in the measurement period.

The illustrated temperature profile does not rise steadily, as to be expected in a cooking process, but has strong fluctuations. The temperature picked up by the temperature sensor 38 even drops at times. The strong fluctuations occur due to interactions of the microwaves with the temperature sensors 38. When the temperature of a temperature sensor 38 rises strongly, it is to be assumed that the same is not heated up in the desired way via the heat conduction in the food, but additionally is heated by direct microwave radiation. Correspondingly, too large slopes can be used as an indication of an incorrectly inserted core temperature probe 22. Due to strong heating, the temperature of the temperature sensors 38 lies above the temperature of the cooking space atmosphere, so that when the microwave generator 16 is switched off, the temperature drops again. The temperature drop also is untypical for a normal cooking operation, so that the same can also be used for detecting direct microwave radiation.

For detecting microwave-related influences on the measurement values, an analysis interval A, B now is selected in a predetermined temporal distance to a switch-on time or switch-off time of the microwave generator 16, so that the operating condition of the microwave generator during the analysis interval is known. For example, the analysis interval A starts when the microwave generator is switched on and ends when the microwave generator is switched off. The analysis interval also can take place a few seconds after switching on the microwave generator, so that the effects of the microwave field have occurred already.

Within this analysis interval A, the slope of the course of the recorded measurement values now is determined by the control unit 20 and compared with a predefined threshold.

The value of the threshold is dependent on the selected analysis interval A, B and can also be adapted to the power with which the microwave generator 16 emits the microwaves.

In the shown analysis interval A, the determined slope exceeds the predefined threshold. It therefore is assumed by the control unit 20 that the core temperature probe 22 is in an incorrect position. This means that the core temperature probe 22 has not been introduced correctly into the food 26 or the receptacle 28 and/or the corresponding temperature sensor 38, whose course of the measurement values has too large a slope, lies outside the food 26 or the receptacle 28.

In these cases the control unit 20 can take countermeasures, in order to prevent a damage of the core temperature probe 22 or an impairment of the cooking process.

For example, the control unit 20 can stop or completely terminate the cooking process and/or by means of suitable output devices issue a warning signal to the user, for example a warning tone or a warning message.

It is also conceivable that the values of the temperature sensor 38, which have too large a slope, are ignored by the control unit 20 during the remaining cooking process.

Alternatively or in addition another analysis interval B can be chosen, which starts with switching off the microwave generator 16.

In contrast to the analysis interval A, the slope determined in analysis interval B is compared with a threshold which is substantially lower, in particular negative. The slope determined in analysis interval B falls below this threshold, so that also based on this comparison it is assumed that the corresponding temperature sensor 38 is not located in the food 26 or the receptacle 28 and/or the core temperature probe 22 is not correctly inserted into the food 26 or introduced into the receptacle 28.

To inform the user of an incorrectly inserted core temperature probe 22 in good time, it is conceivable that before beginning of the cooking process, for example after closing the cooking appliance 10, the microwave generator 16 is briefly put into operation and the method is carried out. Thus, the user can directly be given a feedback on the position of the core temperature probe 22.

It is also conceivable that the assessment of the slope is effected by means of a time-left prediction which is carried out in the control unit 20. The time-left prediction also uses information of the temperature sensors 38, in order to calculate the remaining cooking time. When the temperature of a temperature sensor 38 rises strongly due to microwave radiation, the predicted time left also is reduced drastically. The time left now can be compared by means of a time threshold for usual cooking operations. If the time left falls below the time threshold, it can be assumed that at least one temperature sensor 38 communicates measurement values influenced by microwaves to the control unit 20.

In this case, it is determined whether the slope lies above or below a predefined threshold, i.e. by comparison of the predicted time left with a time threshold. The determination of the time left corresponds to the determination of the slope.

FIG. 5 shows a second embodiment of the core temperature probe 22. The second embodiment of the core temperature probe 22 substantially corresponds to the embodiment as shown in FIG. 3, wherein only the differences will be discussed below and identical or functionally equivalent parts are provided with the previously introduced reference numerals.

The core temperature probe 22 as shown in FIG. 5 includes no dielectric within the trap portion 44. Rather, the region between trap portion 44 and sheath 42 is filled up with material of the handle 52.

In addition, the sheath 42, the trap portion 44 and the end wall 46 are designed as several parts.

The microwave trap 45 thus is formed only of the trap portion 44, the end wall 46 and the sheath 42 in the region of the trap portion 44.

For example, the handle 52 can be manufactured by injection molding, so that filling of the trap portion 44 is easily possible.

It is also conceivable that the space between trap portion 44 and sheath 42 is filled by a separate insert, for example made of PEEK.

Furthermore, the core temperature probe 22 of the second embodiment also differs from that of the first embodiment in that the insertion region 36 is not provided on the side of the handle region 40 opposite the connection 24.

The insertion region 36 here extends vertically from the longitudinal axis of the handle region 40, which in the second embodiment corresponds with the longitudinal axis of the trap portion 44 or is parallel to the same.

Correspondingly, the sheath 42 includes two different portions, which are arranged vertical to each other.

Of course, the different features of the two embodiments can be combined with each other in any way.

Further and almost arbitrary arrangements of the microwave trap 45 in the handle region 40 also are conceivable.

According to a preferred embodiment two microwave traps are arranged, which have a resonance frequency slightly shifted or offset against each other. These microwave traps in particular can be arranged in the handle of the core temperature probe. Independent of the concrete arrangement a more broadband effect, a lower susceptibility to errors and a better suitability for cooking appliances operating with microwave radiation of different frequencies is obtained.

The invention claimed is:

1. A core temperature probe for a cooking appliance, comprising at least one temperature sensor and a connection to a control unit of the cooking appliance, wherein a microwave trap is arranged between the temperature sensor and the connection, the core temperature probe being configured to be inserted into food to be cooked, wherein the core temperature probe includes a handle region, and wherein the microwave trap is arranged in the handle region.

2. The core temperature probe of claim 1 wherein the core temperature probe includes an insertion region, wherein the temperature sensor is arranged in the insertion region and at least one electric line extends from the insertion region through the handle region to the connection and the microwave trap is arranged in the handle region such that it can prevent electromagnetic waves in the microwave range, which propagate in and/or along the line, from reaching the insertion region.

3. The core temperature probe of claim 2 wherein at least in the region of the handle region the line extends in an electrically conductive sheath on which the microwave trap is arranged, wherein the line and the sheath are insulated against each other.

4. The core temperature probe of claim 1 wherein the microwave trap is formed as lambda/4 trap.

5. The core temperature probe of claim 3 wherein the microwave trap includes an electrically conductive and cylindrical trap portion which surrounds the sheath, wherein on its side facing away from the connection the trap portion is in contact with the sheath and is closed up to the sheath.

6. The core temperature probe according to claim 5, characterized in that in the region of the microwave trap between the sheath and the trap portion a ceramic dielectric is provided.

7. The core temperature probe of claim 5 wherein the trap portion has a geometric length which approximately corresponds to the electric length of one quarter of the wavelength of the electromagnetic radiation used in the cooking appliance.

8. The core temperature probe of claim 3 wherein the sheath is designed as tube.

9. The core temperature probe of claim 3 wherein the sheath extends up into the insertion region and the temperature sensor is arranged in the sheath.

10. The core temperature probe of claim 2 wherein the handle region includes a handle which surrounds the microwave trap.

11. The core temperature probe of claim 10 wherein the handle is made of a plastic PEEK material.

12. The core temperature probe of claim 1 wherein the connection is designed without shield.

13. A core temperature probe for a cooking appliance, comprising at least one temperature sensor and a connection to a control unit of the cooking appliance, wherein a microwave trap is arranged between the temperature sensor and the connection, the core temperature probe includes a handle region and an insertion region, and the temperature sensor is arranged in the insertion region, and wherein the microwave trap is arranged in the handle region.

14. A core temperature probe for a cooking appliance, comprising at least one temperature sensor and a connection to a control unit of the cooking appliance, wherein a microwave trap is arranged between the temperature sensor and the connection, the core temperature probe includes a handle region and an insertion region, the temperature sensor is arranged in the insertion region and at least one electric line extends from the insertion region through the handle region to the connection, and the microwave trap is arranged in the handle region such that it can prevent electromagnetic waves in the microwave range, which propagate in and/or along the line, from reaching the insertion region.

* * * * *